United States Patent
Yetukuri et al.

(10) Patent No.: US 6,948,773 B2
(45) Date of Patent: Sep. 27, 2005

(54) HELICAL HEAD RESTRAINT GUIDE

(75) Inventors: Nagarjun Yetukuri, Rochester Hills, MI (US); Mladen Humer, Eastpointe, MI (US); Mark Farquhar, Ortonville, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/779,832

(22) Filed: Feb. 17, 2004

(65) Prior Publication Data

US 2005/0179299 A1    Aug. 18, 2005

(51) Int. Cl.[7] ............................................. B60R 22/28
(52) U.S. Cl. ...................................... 297/410; 297/391
(58) Field of Search ................................ 297/410, 391, 297/452.18, 440.24, 440.1, 452.2; 403/348, 403/349

(56) References Cited

U.S. PATENT DOCUMENTS

| | | | |
|---|---|---|---|
| 4,190,291 A | * | 2/1980 | Korger ........................ 297/408 |
| 4,678,232 A | | 7/1987 | Ishida et al. |
| 4,798,415 A | | 1/1989 | Tanino et al. |
| 5,788,250 A | * | 8/1998 | Masters et al. ............. 297/410 |
| 5,816,658 A | * | 10/1998 | Wallis ........................ 297/410 |
| 5,895,094 A | | 4/1999 | Mori et al. |
| 6,062,645 A | * | 5/2000 | Russell ....................... 297/410 |
| 6,074,010 A | | 6/2000 | Takeda |
| 6,761,409 B2 | * | 7/2004 | Ford ........................... 297/410 |
| 6,789,850 B1 | * | 9/2004 | Hann ........................... 297/391 |

FOREIGN PATENT DOCUMENTS

JP          200442689       *   2/2004

* cited by examiner

Primary Examiner—Milton Nelson, Jr.
(74) Attorney, Agent, or Firm—Bill Panagos

(57) ABSTRACT

A torqued, error proofed for installation, chuck free helical head restraint guide that includes a head restraint guide assembly with at least two stems, a button sub assembly, and a bezel. The stems include a helix at one end of each stem and a multi-point socket head, an open wrench flat, and/or an internal torx head and crush ribs at the other end. The head restraint guide also includes a motor vehicle passenger seat that includes an upper cross member of a back frame with upper and lower openings. The head restraint guide further includes a head restraint assembly with head restraint posts and a head restraint pad.

16 Claims, 5 Drawing Sheets

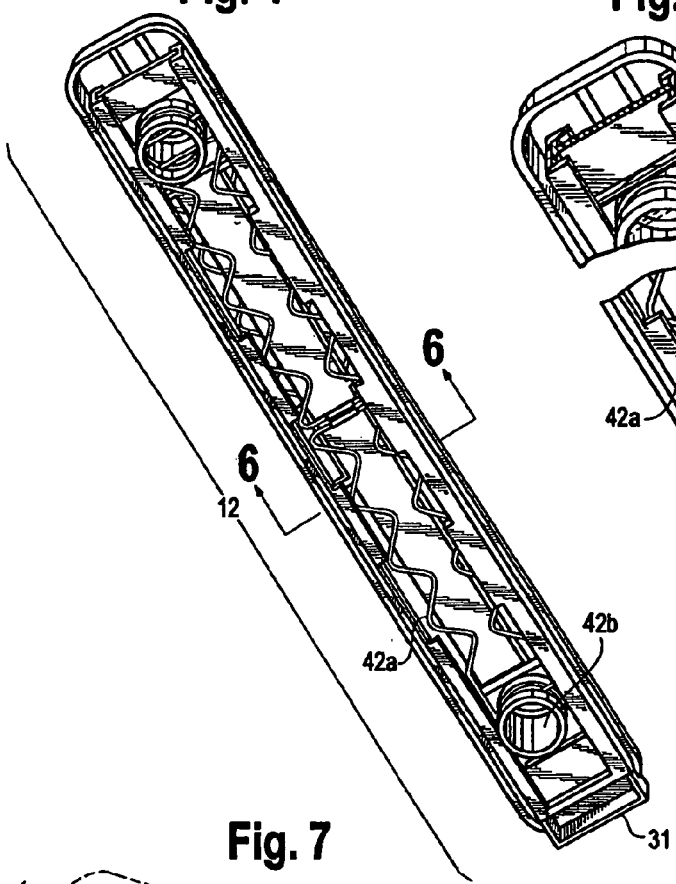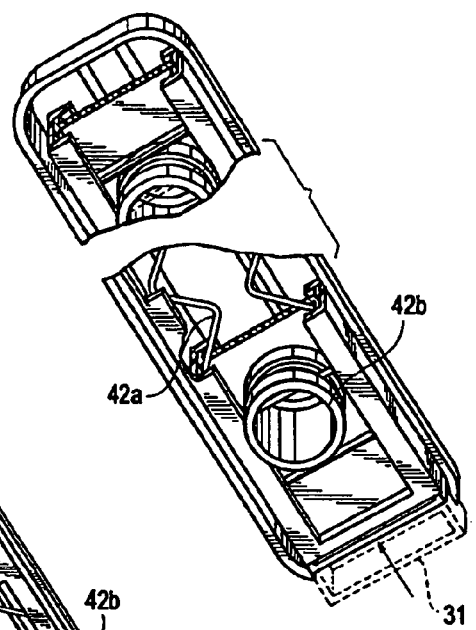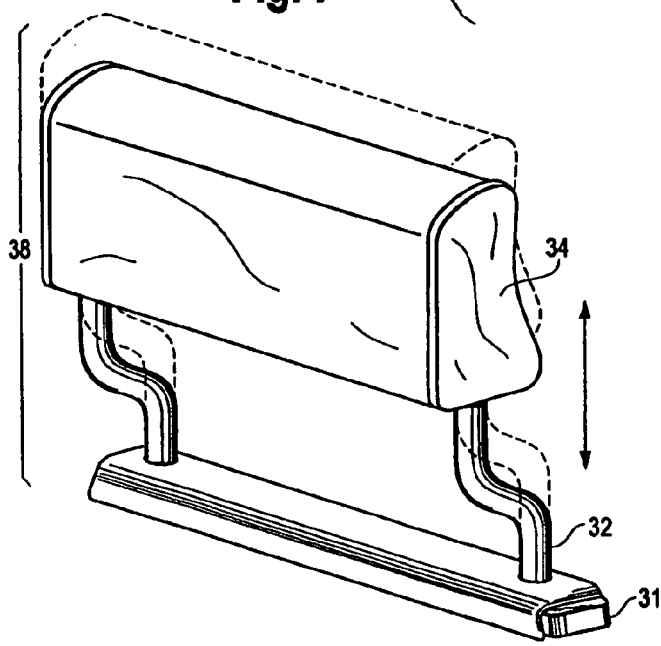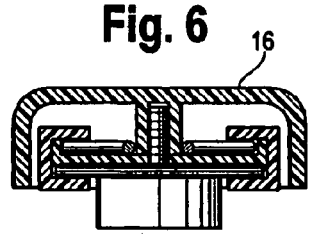

HELICAL HEAD RESTRAINT GUIDE

FIELD OF INVENTION

This invention relates to head restraints in motor vehicles. More specifically, it relates to a head restraint guide that is torqued, error-proofed for installation, and chuck free.

BACKGROUND OF INVENTION

Today, most, if not all, motor vehicles come with seats equipped with head restraints. Head restraints provide not only comfort for riders but also serve the function of protecting an occupant's head and neck in case of an accident.

Head restraint systems typically have head restraint guides within the back frame of the seat. Typical head restraint guides are installed after the seatback is foamed and trimmed. The problem with installing the head restraint guides after the seat is foamed and trimmed is that it is then difficult to install and then if necessary, difficult to remove from the back frame. This can be a costly approach to installing head restraint guides.

Another problem that typical head restraint guide assemblies encounter is that they may only be installed in exactly one manner. Head restraint guides in prior art must either be inserted on the in board or on out board side. Guides in prior art have stems that must be installed in one particular manner. Typically, the head restraint guides are not interchangeable with each other. As a result, one may encounter difficulty in finding replacement pieces for repairs and can add more time to installation. Costs also increase if parts are installed or repaired improperly due to the installer's confusion.

Another problem is that typical head restraint guides have chuck between the guide and seatback and thereby increase the chuck of head restraint assembly to seat frame. This can cause significant rattling noises between the head restraint assembly to the seat frame. Manufacturers and consumers alike find it highly desirable to minimize rattle between the seat parts so as to not cause further distractions while driving.

This invention embodies two different versions of the torqued, error-proof, chuck-free, helical head restraint guide. One version is dual locked and the other is single locked. Both versions allow for error proof installation in that the stems are both identical and can be dropped into the back frame in any orientation and they align themselves properly. The stems are also installed before the foaming and trimming of the seat which allows the installer to have a better view of the installation and will eliminate installation errors. The stems also have a helix that allows for them to be torqued and not hammered. At the end of the helix is a hard stop that provides a positive stop for the torquing process, thereby reducing error in installation. Both versions also have certain safety features, such as anti-removal features to prevent the guide from being removed without the proper tools.

The dual locked version also has other features that help to solve the above mentioned problems in that there is a single bezel assembly for both stems and the bezel assembly is snapped onto the stems in an error proof manner, namely that it can not be turned one hundred eighty degrees and then be installed. The dual locked version also provides for improved load carrying capability and improved lateral chuck performance because the head restraint guide is locked on both of the head restraint posts. For safety reasons, the head restraint is also not able to be removed from the guide without the use of a tool.

SUMMARY OF INVENTION

The object of this invention relates to an improved head restraint guide. The dual locked, torqued, error proofed for installation, chuck-free helical head restraint guide comprises a guide assembly further comprising at least two stems, a button sub-assembly, and bezel; a seat in a motor vehicle comprising an upper cross member of the back frame; and a head restraint assembly comprising head restraint posts and head restraint pad.

The stem further comprises a helix at one end and a multi-point socket head, open wrench flats, or internal torx head and crush ribs at the other. The helix on the stems fit into corresponding openings on upper cross member of the back frame. The stem binds the upper cross member of back frame against the crush ribs near the multi-point socket head or open wrench flats. The stems with helix are screwed into the corresponding openings on the upper cross member of the back frame before the motor vehicle seat is foamed and trimmed.

The button sub-assembly and bezel fit over the stem after the seat is trimmed. The head restraint assembly is then inserted through holes in the guide assembly.

The button sub-assembly further comprises a button frame and springs. The springs comprise two adjustment locking springs and one spring to prevent headrest removal without an appropriate tool. The springs are pre-assembled to the button sub-assembly and are snap fitted into the bezel.

Another embodiment of this invention is the single-locked, torqued, error proofed for installation, chuck free, helical head restraint guide comprising at least one stem, a bezel assembly, an upper cross member of the back frame of a motor vehicle with upper and lower openings, and a head restraint assembly further comprising head restraint posts and a head restraint pad. The stem further comprises a helix at one end of the stem and a multi-point socket head and crush ribs at the other end.

The stem is twisted into an opening of the upper cross member of the back frame. The upper opening of the upper cross member binds the stem at the crush ribs.

The bezel assembly fits onto the stem after the seat is foamed and trimmed. The stem comprises tracks for correct installation of the bezel assembly. The bezel assembly further comprises locking teeth and a tab.

The error proof installation of bezel comprising a bezel assembly and stem with tracks installed into the upper cross member of the back frame in a motor vehicle. The bezel assembly is slid into the stem at an angle utilizing tracks to ensure proper installation. The bezel assembly further comprises locking teeth to prevent rotation within the stem, removal and to withstand vertical locking loads.

This invention has many features that are unique when compared to existing art. First, the stems of this invention are installed before the seat is foamed and trimmed. This facilitates installation and removal. Typically, head restraint guides are installed after foaming and trimming leading to blind installation and frequent damage. Second, the multi-point socket head allows the head restraint guide assembly to be torqued down with a tool instead of the usual way of being thrust or hammered into seat frame. Third, the helix, multi-point socket head, open wrench flats, or internal torx head, and crush ribs facilitate tight installation to eliminate the chuck between the head restraint guide assembly and the seat frame. Typical head restraint guides have significant chuck.

DETAILED DESCRIPTION OF DRAWINGS

FIG. 4 is an underside view of the bezel and button sub-assembly, depicting the springs and button.

FIG. 5 is an underside view of the button in action.

FIG. 6 is a cross-sectional view of the bezel and button sub-assembly.

FIG. 7 is a view of the finished head restraint in the seat of a motor vehicle utilizing the head restraint guide (not seen as they are buried under foam and trim).

DETAILED DESCRIPTION OF THE PREFERRED EMBODIMENT

Figure 1:
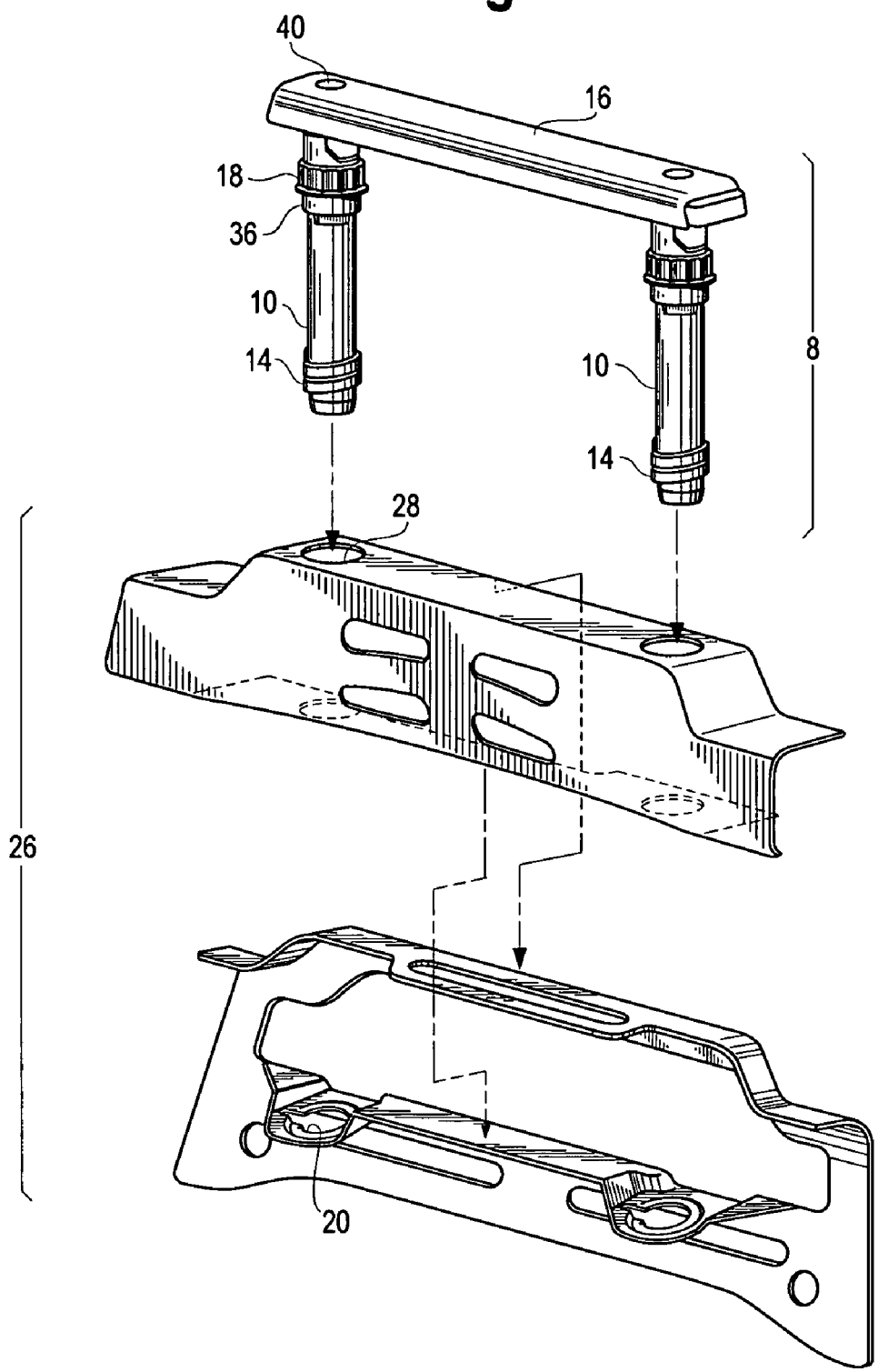
FIG. 1 depicts how the head restraint guide fits into the upper cross member of the back frame of the seat in a motor vehicle in the dual locking embodiment.
Figure 2:
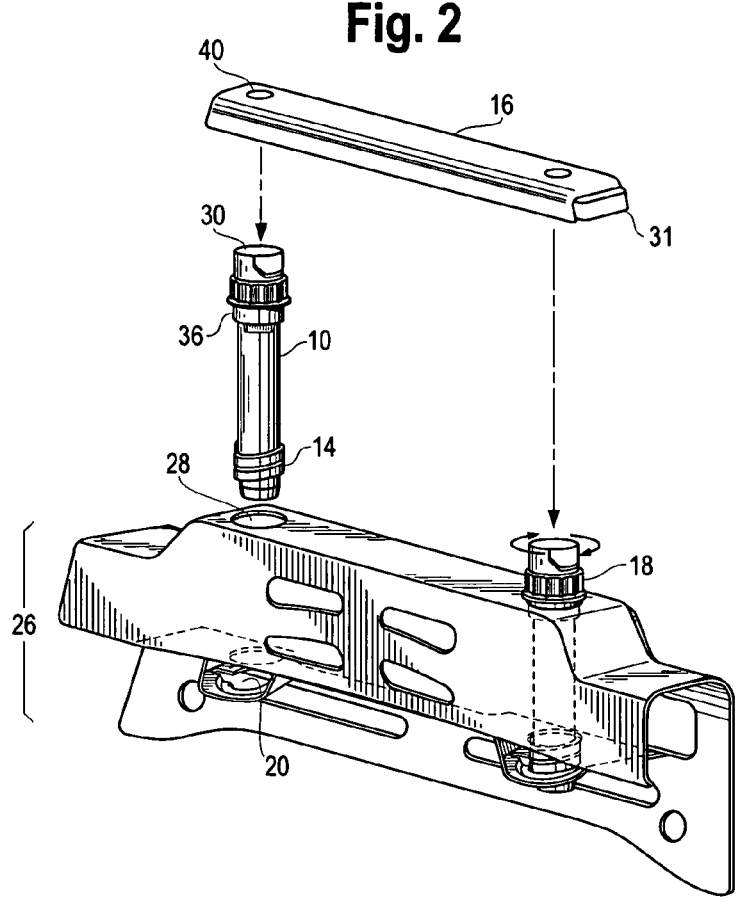
FIG. 2 is a view of the stems in the dual locking embodiment as they fit into the upper cross member of the back frame of the seat in a motor vehicle.
Figure 3:
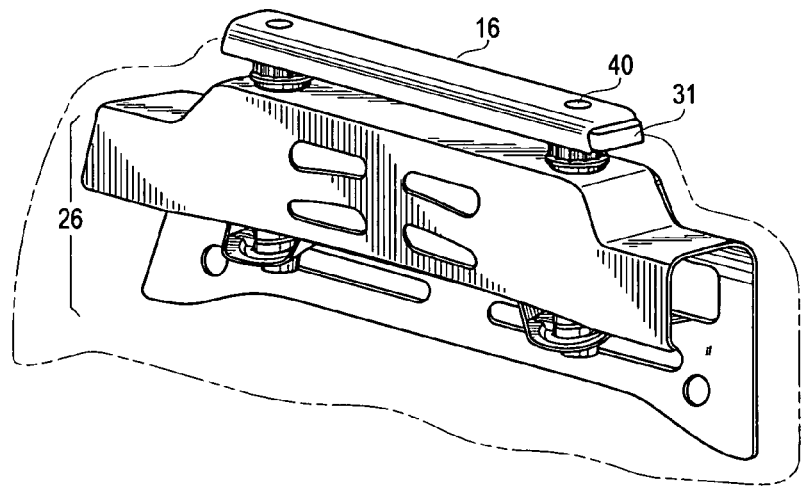
FIG. 3 is a view of the stems in the upper cross member of the back frame of the seat in a motor vehicle in the dual locking embodiment.
Figures 8, 9, 10:
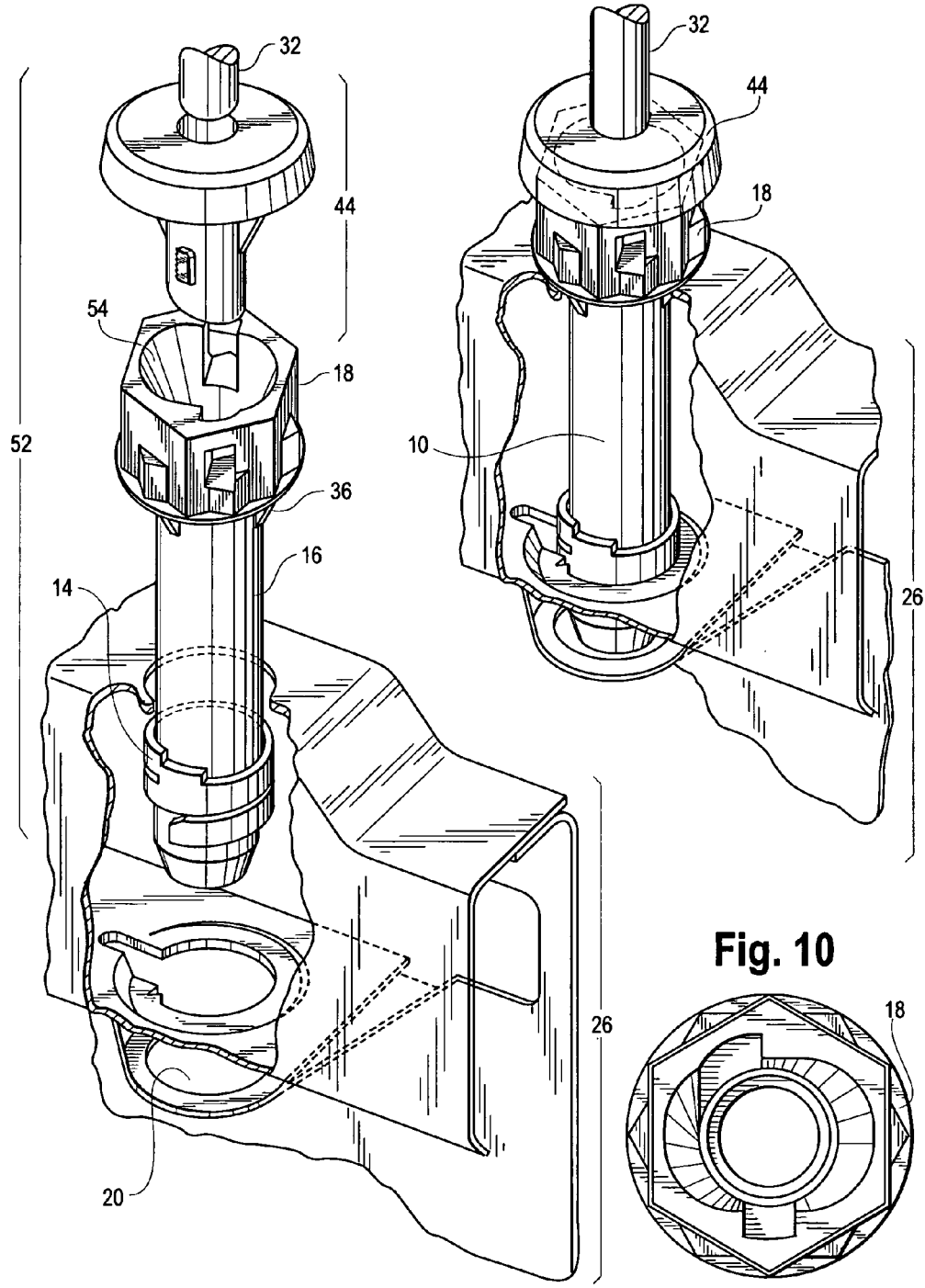
FIG. 8 is an exploded view of the single locking embodiment.
FIG. 9 is a view of the stem of the single locking embodiment as it fits into the upper cross member of the back frame of the seat in a motor vehicle.
FIG. 10 is a view through the multi-point socket head.
Figure 11:
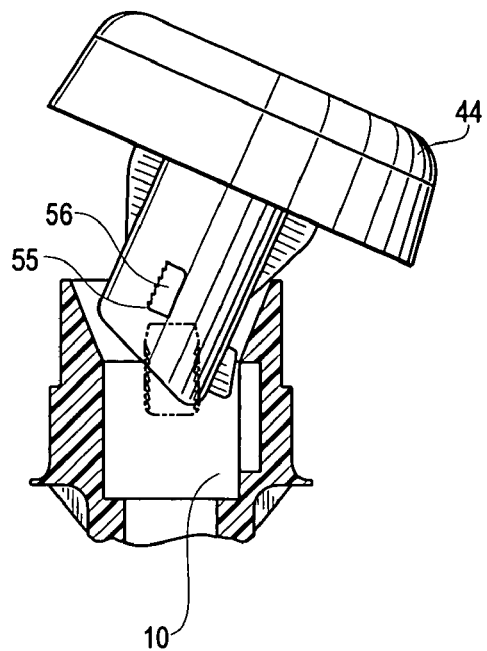
FIGS. 11–14 depict the motion of the error proof installation of the bezel into the stem in the single locking embodiment.
Figure 12:
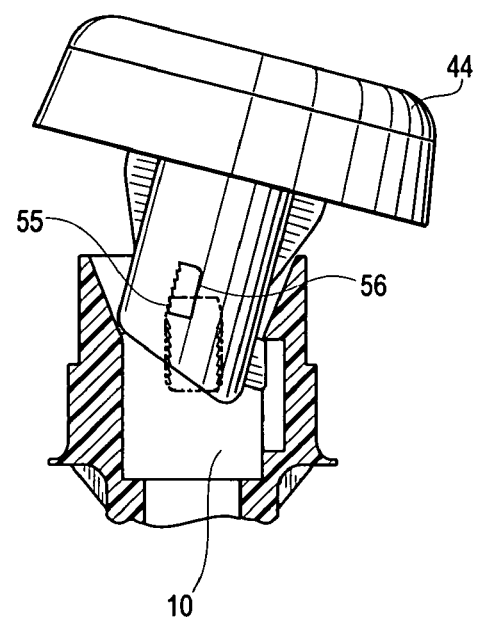
Figure 13:
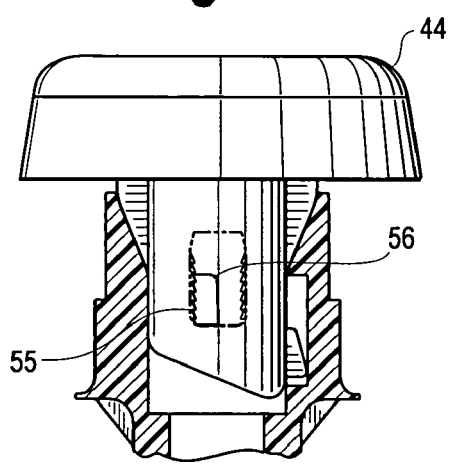
Figure 14:
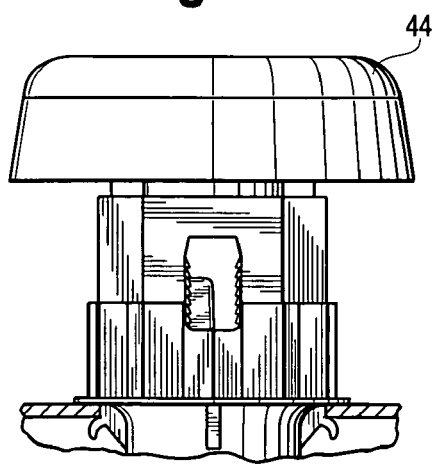

In one of the preferred embodiments, this dual locked, torqued, error proofed for installation, chuck free helical head restraint guide comprises a head restraint guide assembly 8 further comprising at least two stems 10, a button sub-assembly 12 and bezel 16; a seat for a motor vehicle (not shown) comprising an upper cross member 26 of the back frame; and a head restraint assembly 38 further comprising head restraint posts 32 and a head restraint pad 34.

The stems 10 are identical to one another and comprise a helix 14 at one end and a multi-point socket head 18, open wrench flats 30, or and/or internal torx head and crush ribs 36 at the other end. The crush ribs 36 enable a tight fit between the stems 10 and the upper hole 28 in the upper cross member 26 of the back frame. The upper cross member 26 of the back frame of the seat has lower openings 20. These lower openings 20 corresponds to the helix 14 on each of the stems 10. These lower openings 20 accept the helix 14 on the stems 10. The stems 10 are screwed into the upper cross member 26 with a tool before the foam and trim are added to the frame of the seat. Since the stems 10 are twisted into the lower opening 20, there is no need to hammer or otherwise force the stems 10 into place. Those skilled in the art will recognize that the helix 14 can instead correspond to the upper opening 28. As the stems 10 are torqued into place, there is a rotational stop that will allow the manufacturer to sense when the stems 10 are in place. It is important to note that manufacturers may prefer to utilize an anti-rotation/ anti-removal feature. This anti-rotation/anti-removal feature can be a feature such as locking teeth so as to prevent removal of the head restraint guide. The stems 10 then bind into the upper cross member 26 against the crush ribs 36 near the multi-point socket head 18 or open wrench flats 30.

In this preferred embodiment, this head restraint guide assembly 8 will have two stems 10. Each stem 10 is identical to the other and is installed as described above. Having identical stems 10 reduces costs from improper installation and repair and eliminates installation confusion that is very common in this industry. The stems 10 are error proofed for installation in that they can simply be dropped into the corresponding lower opening 20 and the upper hole 28 and they will always acquire pre-determined orientation after being torqued. This feature also helps to avoid installation confusion and repair or replacement costs because a stem 10 will fit into either position.

Once the stems 10 are in place, the seat can be foamed and trimmed. After the seat is foamed and trimmed the button sub-assembly 12 and bezel 16 are snapped together and together they are snapped on the stems 10. Once the head restraint guide assembly 8 is in place, the head restraint assembly 38 is inserted through the holes 40 in the head restraint guide assembly 8. This head restraint guide assembly 8 allows for the head restraint posts 32 to be locked.

In this preferred embodiment of this invention there is a dual locking mechanism. The button sub-assembly 12 and bezel 16 lock on both head restraint posts 32. The button sub-assembly 12 comprises a button 31 and at least one spring 42. The springs provide both the locking force and locking tab for this invention. The head restraint assembly 38 can be adjusted up or down by simply depressing the button 30 inwards. This inward pressure will let the head restraint assembly 38 move freely either up or down. There is one spring for adjustment locking 42a and one spring to serve as an upward stop 42b so as to prevent the head restraint assembly 38 from being removed without a tool. An important proposed safety regulation requires removal of a head restraint assembly 38 only with the use of a tool. These springs can be pre-assembled to the button sub-assembly 12 and then snap fitted into the bezel 16. These adjustment locking springs 42a are used such that the head restraint assembly 38 load bypasses the bezel 16 and goes directly into the stems 10.

In another preferred embodiment of this invention, the single-locked, torqued, error proofed for installation, helical head restraint guide comprises a head restraint guide assembly 52 further comprising at least one stem 10 and a bezel assembly 44; said stem 10 further comprising a helix 14 at one end of stem 10 and a multi-point socket head 18, open wrench flats 30, or internal torx head and crush ribs 36 at the other end; a motor vehicle passenger seat comprising upper cross member 26 of back frame with upper holes 28 and lower openings 20; and a head restraint assembly 38 further comprising head restraint posts 32 and a head restraint pad 34.

The helix 14 of the stem 10 is torqued into the lower opening 20 of the upper cross member 26 by a tool. However, those skilled in the art will recognize that the helix 14 can also be on the opposite end of the stem 10 and be torqued instead into the upper hole 28. If desired, the lower opening 20 and the upper hole 28 can be outfitted with and anti-rotation/anti-removal feature. This anti-rotation/anti-removal feature can be a feature such as locking teeth. The anti-rotation feature/anti-removal can prevent removal of the stem 10 without a tool. The stem 10 then binds into the upper cross member 26 against the crush ribs 36. The stem 10 can be inserted into the in board or out board side of the seat. The stem 10 is installed before the passenger seat is foamed and trimmed.

The stem 10 is error proofed for installation in that it can simply be dropped into the corresponding lower opening 20 and upper hole 28 and it will always be in the correct position. This feature also helps to avoid installation confusion and repair or replacement costs.

Once the passenger seat is foamed and trimmed, the bezel assembly 44 can be installed. In this single-locking embodiment, the bezel assembly 44 is designed to be installed from rear of the passenger seat only. The bezel assembly utilizes tracks 54 within the stem 10 to ensure proper installation.

Another embodiment of this invention relates to the installation of the bezel assembly 44 into the stem 10 of the single-locked, torqued, error proofed for installation helical head restraint guide. This error proof installation of bezel for a single-locked torqued, error proof helical head restraint guide comprises a bezel assembly 44 and a stem 10 with tracks 54 installed into the upper cross member 26 of a back frame of a passenger seat in a motor vehicle.

The bezel assembly 44 slides into the stem 10 at an angle utilizing said tracks 54 to ensure proper alignment. By utilizing the tracks 54, a person installing the bezel assembly 44 will instantly know whether it is being installed properly. Also, by tilting the bezel assembly 44 into the tracks 54, there is very little chance that the bezel assembly 44 will be damaged. The bezel assembly 44 further comprises a tab 56 to prevent rotation and/or removal by locking into teeth 55 on stem 10.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A dual-locked, torqued, error proofed for installation, chuck free helical head restraint guide comprising:
    a head restraint guide assembly further comprising at least two stems, a button sub assembly, and bezel, said stems further comprising a helix at one end of each stem and a multi-point socket head, an open wrench flat, and/or an internal torx head and crush ribs at the other end;
    a motor vehicle passenger seat comprising an upper cross member of a back frame with upper and lower openings; and
    a head restraint assembly further comprising head restraint posts and a head restraint pad.

2. The dual-locked, torqued, error proofed for installation, chuck free helical head restraint guide as in claim 1, wherein each of said stems is dropped in any orientation into corresponding openings on said upper cross member of said back frame, said stems binding said upper cross member of said back frame against said crush ribs.

3. The dual-locked, torqued, error proofed for installation, chuck free helical head restraint guide as in claim 2, wherein said stems with said helix are screwed to a stop into said corresponding openings on said upper cross member of said back frame before foam and trim are assembled on said motor vehicle passenger seat.

4. The dual-locked, torqued, error proofed for installation, chuck free helical head restraint guide as in claim 2, wherein said button sub-assembly and bezel are error proofed for installation over said stems in said upper cross member of said back frame after said motor vehicle passenger seat of motor vehicle is foamed and trimmed.

5. The dual-locked, torqued, error proofed for installation, chuck free helical head restraint guide as in claim 1, wherein said head restraint assembly is inserted through holes in said head restraint guide assembly; said head restraint guide locks on both posts of said head restraint assembly.

6. The dual-locked, torqued, error proofed for installation, chuck free helical head restraint guide as in claim 1, wherein said button sub-assembly further comprises a button frame and at least one spring.

7. The dual-locked, torqued, error proofed for installation, chuck free helical head restraint guide as in claim 6, wherein said at least one spring further comprises an adjustment locking spring and a spring to prevent headrest removal without a tool.

8. The dual-locked, torqued, error proofed for installation, chuck free helical head restraint guide as in claim 6, wherein said spring is pre-assembled to said button sub-assembly and snap fitted to said bezel.

9. A single-locked, torqued, error proofed for installation, chuck free helical head restraint guide comprising:
    a head restraint guide assembly further comprising at least one stem and a bezel assembly; said stem further comprising a helix at one end of said stem and a multi-point socket head or open wrench flats and crush ribs at the other end;
    a motor vehicle passenger seat comprising an upper cross member of a back frame with upper and lower openings; and
    a head restraint assembly further comprising a plurality of head restraint posts and a head restraint pad.

10. The single-locked, torqued, error proofed for installation, chuck free helical head restraint guide as in claim 9, wherein said helix on said stem fits into a corresponding opening on said upper cross member of said back frame of said motor vehicle passenger seat, said stem binding said upper cross member of said back frame against said crush ribs.

11. The single-locked, torqued, error proofed for installation, chuck free helical head restraint guide as in claim 10, wherein said stem with said helix is screwed to a stop into said corresponding opening on said upper cross member of said back frame before foam and trim are assembled, said helix further comprising ratchet teeth to prevent untorquing of said stem.

12. The single-locked, torqued, error proofed for installation, chuck free helical head restraint guide as in claim 9, wherein said bezel assembly fits into said stem after said stem is installed into said upper cross member of said back frame and after said motor vehicle passenger seat is foamed and trimmed.

13. The single-locked, torqued, error proofed for installation, chuck free helical head restraint guide as in claim 12 wherein said stem further comprises tracks for correct installation of said bezel assembly.

14. The single-locked, torqued, error proofed for installation, chuck free helical head restraint guide as in claim 13, wherein said bezel assembly further comprises a tab and locking teeth.

15. A head restraint guide comprising:
    a stem with an axis and a plurality of tracks, said stem installed into an upper cross member of a back frame of a passenger seat in a motor vehicle; and
    a bezel assembly with an axis, said bezel assembly adapted for installation in said stem, wherein said tracks are adapted to guide installation of said bezel assembly such that the axis of the bezel assembly can be tilted at a positive angle relative to the axis of said stem, thereby ensuring proper alignment of said bezel assembly.

16. The head restraint guide as in claim 15, wherein said bezel assembly further comprises a tab with locking teeth to resist removal of said bezel assembly from said stem.

* * * * *